United States Patent
Schacher et al.

[15] 3,667,580
[45] June 6, 1972

[54] MACHINE TOOL INDEXING SYSTEM

[72] Inventors: Willi Schacher, Friedrichshafen; Heinz Marschner, Kressbronn, both of Germany

[73] Assignee: Zahnradfabrik Friedrichshafen, ·AG, Friedrichshafen, Germany

[22] Filed: May 1, 1970

[21] Appl. No.: 33,545

[30] Foreign Application Priority Data

May 3, 1969 Germany......................P 19 22 644.9
June 14, 1969 Germany......................P 19 30 295.5

[52] U.S. Cl. ..........................................192/12 A, 188/291
[51] Int. Cl. ....................................F16d 67/02, F16d 57/00
[58] Field of Search.............192/12 A, 12 C, 17 A; 188/290, 188/291; 417/237

[56] References Cited

UNITED STATES PATENTS

| | | | |
|---|---|---|---|
| 2,226,801 | 12/1940 | Black | 192/12 A X |
| 2,484,913 | 10/1949 | Snell | 192/12 A |
| 2,827,133 | 3/1958 | Schneider | 192/12 A X |
| 3,159,246 | 12/1964 | Ahlen | 188/291 X |

*Primary Examiner*—Robert M. Walker
*Attorney*—Albert M. Zalkind

[57] ABSTRACT

In a machine tool a spindle is brought to a slow speed, e.g., for indexing to selective angular positions, by means of a clutch and a hydraulic pump, in a hydraulic control system, wherein the spindle is slowed down, or stopped, or reversed. The construction, and a number of modifications, envisages carrying a conventional indexing mechanism preferably on the spindle itself, together with the clutch, as well as the hydraulic pump in a compact assembly. The hydraulic system includes a pressure source and a throttle which controls differential pressures acting on the hydraulic pump to drive it as a motor by which the slow speed of the spindle is produced by rotation thereof through the clutch. Differential pressure in the system can be utilized in conjunction with a control device to which an indexing mechanism actuation is responsive. However, the invention has use in any installation where a compact mechanism for slow drive of a shaft is desired, or where it is desired to stop and momentarily reverse such shaft, the main power to the shaft being rendered ineffective in any suitable manner when the mechanism of the invention is operating.

4 Claims, 6 Drawing Figures

INVENTORS
Willi Schacher
Heinz Marschner

ATTORNEY

PATENTED JUN 6 1972 3,667,580

INVENTORS
Willi Schacher
Heinz Marschner

ATTORNEY

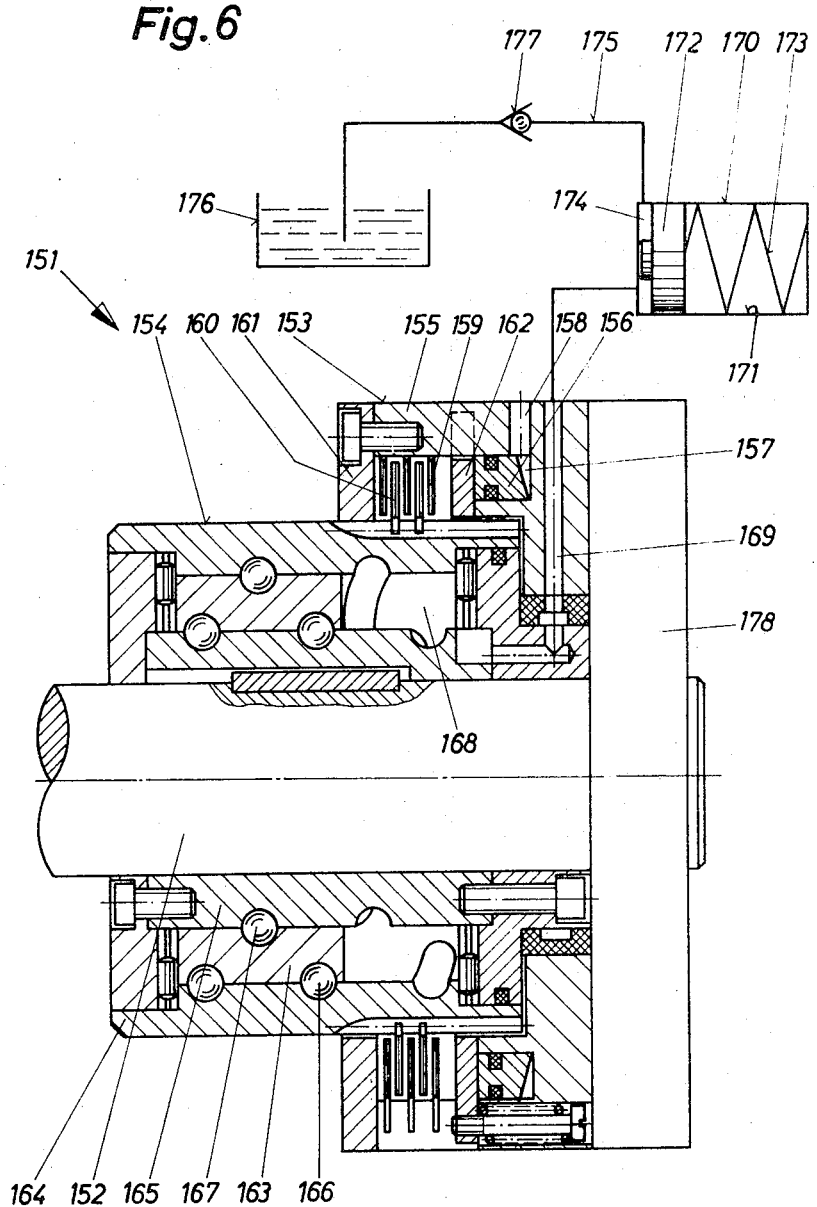

MACHINE TOOL INDEXING SYSTEM

The present invention overcomes various drawbacks of the prior art in which a number of different systems have been used for effecting shaft indexing. Thus one such system uses an entirely separate motor for slow speed shaft indexing requiring relatively expensive control parts.

Another system for use of multispindle auto lathes comprises a plurality of clutches which must be of a duplex type and includes mechanical elements which are complex.

A further system requires very precise control of movement of a coupling sleeve to several positions for low speed control, and is likewise complex and expensive.

Briefly, the present invention provides a system which is relatively simple when compared with prior art systems and more economical in that easily manufactured mechanical parts such as a friction clutch or a friction brake of conventional construction can be mounted in a compact arrangement with a conventional type of reversible hydraulic pump or motor, such components all being mounted on the machine spindle to be indexed. The hydraulic control system is relatively simple, utilizing a common pressure feed line for both the clutch, or brake, and the pump. In various modifications to be disclosed herein a pressure accumulator is used in the hydraulic system which has the effect of rotating the machine spindle in a reverse direction upon certain conditions being met so that indexing occurs in the course of this reverse rotation which occurs for a short time.

The basic principle of the invention is amenable to various modifications as will be apparent from the description, including electrical control, that is, solenoid operation of the clutch or brake, all in a compact assembly unit.

Further, the invention is not limited to a vane type pump but in one modification, at least, employs a piston type pump.

In general, the principle of the invention is characterized by relatively simple construction and a high degree of operational safety as well as ease of controllability.

A detailed description of the essentials of the invention now follows in conjunction with the appended drawing in which:

FIG. 6 shows a still further system modification wherein a reciprocal type of pump is utilized.

Figure 1:
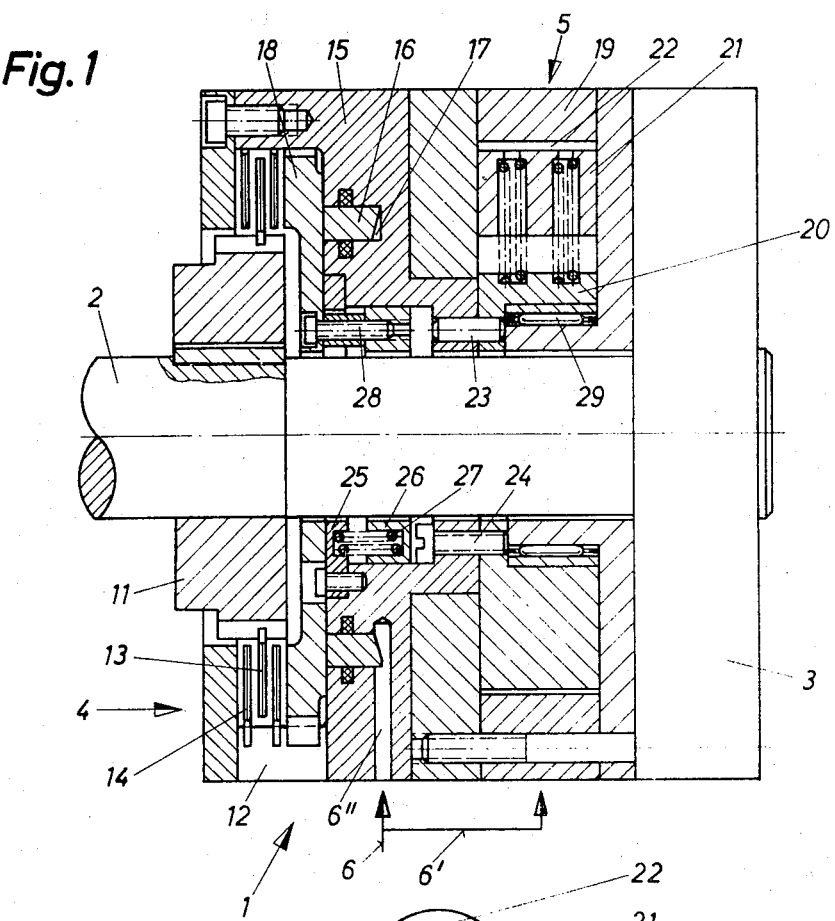
FIG. 1 shows a cross section in elevation of the components of one form of the invention utilizing a friction clutch and reversible hydraulic pump functional as a hydraulic motor.
Figure 2:
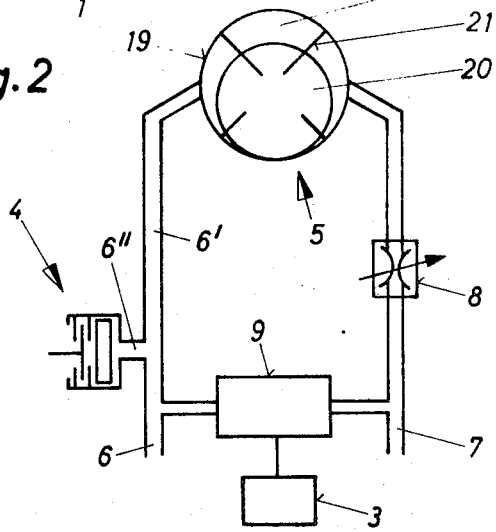
FIG. 2 shows a symbolic diagram of the hydraulic system used in conjunction with the mechanism illustrated in FIG. 1.

Referring to FIG. 1, the structure 1 of the invention comprises a compact assembly of components mounted on a shaft 2 which is the shaft to be indexed by means of a conventional automatic indexing head 3 likewise mounted on the shaft and coacting therewith in a known manner under control of the hydraulic system depicted in FIG. 2, and more specifically the control device 9.

The invention comprises a clutch 4 and reversible vane type hydraulic pump or a hydraulic motor 5 in a single assembly unit for compactness. For purposes of uniformity component 5 in FIG. 1 and its equivalent in the other modifications will be referred to as a pump. It would, of course, be possible to utilize the indexing mechanism 3 in a separate assembly on the shaft 2, while the clutch and hydraulic pump are carried on the power take-off gear unit of the machine (not shown).

A source (not shown) of pressure feeds via conduit 6 branching to one side of the hydraulic pump 5 via conduit 6' and to clutch 4 via conduit 6''. The other side of pump 5 connects to an exhaust conduit 7 through an adjustable throttle 8. Bridging the inlet and outlet conduits 6 and 7, respectively, is a pressure differential responsive control device 9 to which the actuating mechanism of indexing head 3 reacts in a known manner, the condition responsive being a predetermined r.p.m. of shaft 2.

Clutch 4 is of conventional construction having an inner hub 11 keyed to shaft 2 and carrying the inner friction discs 13, while the outer discs 14 key to bars such as 12 of the clutch housing bolted to cylinder 15 which connects integrally via pins 23 and screws 24 to the rotor 20 of pump 5, it being understood that the pump is of conventional construction and carries the usual vanes 21 having a pressure or pumping chamber 22. The stator of the pump comprises the fixed or stationary housing 19, the rotor 20 being mounted on needle bearing 29, supported coaxially on a collar extending from the indexing device, as shown.

Within the cylindrical rotary housing 15 there is a pressure chamber 17 for a slidable piston in the form of a ring 16 engageable with a pressure plate 18 for closing the clutch plates to effect drive engagement of rotor 20 from shaft 2. Normally, springs, such as 27, effect disengagement of the clutch plates, the springs being disposed between end ring 26 connected by means of screws 28 to the pressure plate 18, wherein the opposite ends of the springs react through an end ring 25 fastened to cylinder 15 by screws, as shown. Thus, it will be seen that expansion of the springs will pull pressure plate 18 away from the clutch discs via the screws 28 in a well known manner.

A pressure chamber 22 is swept by the rotor vanes 21 and connects intermediate the inlet and outlet conduit lines 6' and 7, respectively, in the usual manner.

Normally, shaft 2 rotates at high speed in the operation of the machine and clutch 4 is disengaged, pump 5 not being effective in any way at this time. However, for effecting indexing, if pressure fluid is fed to conduit 6, clutch 4 is engaged by pressure fluid in 6'' to chamber 17 and piston 16. Accordingly, shaft 2 drives the rotor 20 and pump 5 has a pumping function. A peak pressure is effected in pressure chamber 22 by means of the adjustable throttle 8. This, of course, has a slowing effect on the rotor being driven from shaft 2 and thus slows shaft 2. In effect, clutch 4 is now serving as a brake with reaction support being provided by the increasing torque resistance in the pump. As long as pressure in inlet 6 remains less than that in outlet 7, pump 5 must serve as a pump, although effecting a slowdown on shaft 2. The slowing action continues up to the point where the pressure in line 6 exceeds the pressure in line 7 and the pump 5 starts its motor function to effect driving of shaft 2 at a slow r.p.m. which can be varied by further adjustment of the throttle 8. Such differential pressure between the inlet and outlet conduits is fed to the control device 9 to which the indexing head 3 becomes responsive to stop the shaft at a selective angular position.

In an instance where shaft 2 is stationary and pressure is fed through conduit 6, pump 5 immediately starts a hydraulic motor function and will drive the shaft at any adjusted slow speed via clutch 4, which is, of course, closed by the pressure in conduit 6 at this time. Again, the indexing device under control of the control device 9 becomes effective.

Figure 3:
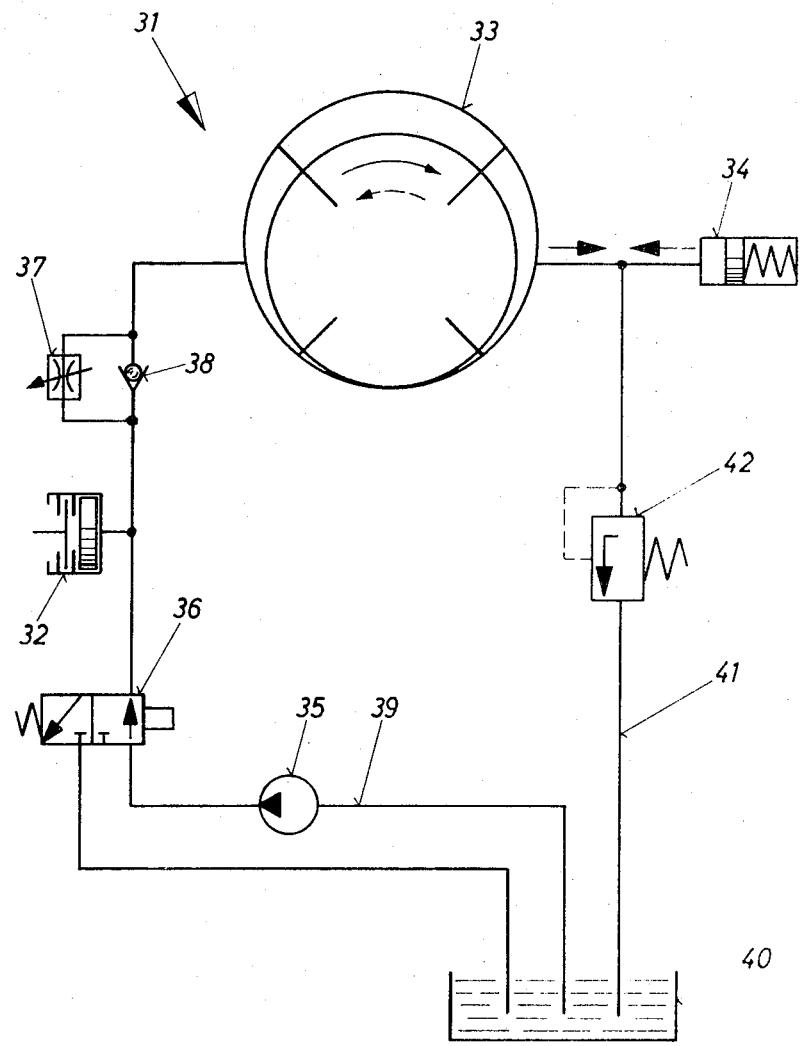
FIG. 3 shows a symbolic diagram illustrating a hydraulic system for another form of the invention utilizing a pressure accumulator.

Referring to the modified hydraulic system of FIG. 3, the installation 31 comprises the hydraulic operable friction clutch 32 and reversible vane pump 33 including a pressure accumulator 34 of conventional construction connecting to the line from one side of the pump which line also goes to a relief valve jet 42 and thence via return conduit 41 to the open tank 40. The pressure conduit 39 leads from the tank to a pressure pump 35 and thence to a multiway pressure operated valve 36 having a return line to the tank, as shown. From valve 36 the pressure or inlet line connects to clutch 32 for pressure operation thereof and thence to a relief check valve 38 bridged by an adjustable throttle valve 37 and finally to the other side of the reversible pump 33.

Pressure from pump 35 controlled via valve 36 engages clutch 32 to drive the rotor of pump 33, similar to the arrangement of FIG. 1.

When pump 33 is rotating in the direction of the solid arcuate arrow, it effects a pumping pressure that builds up in the accumulator 34 so that when clutch 32 is closed a pressure fluid from accumulator 34 feeds back in the direction of the broken arrow to cause reversal of rotation of the pump (broken arcuate arrow), now acting as a motor.

The construction and arrangement is such that the pressure from the accumulator 34 becomes greater than the pressure coming from pump 35 and the reverse rotation of the pump can be controlled as to speed via the throttle 37. The operation is essentially one of adjusting pressures on both sides of pump 33 whereby the pressure differential effected by adjustment of throttle 37 to cause slow rotation of the pump rotor will be understood to be controlling on an indexing device for the shaft extending from clutch 32, as heretofore described with regard to FIG. 1.

Figure 4:
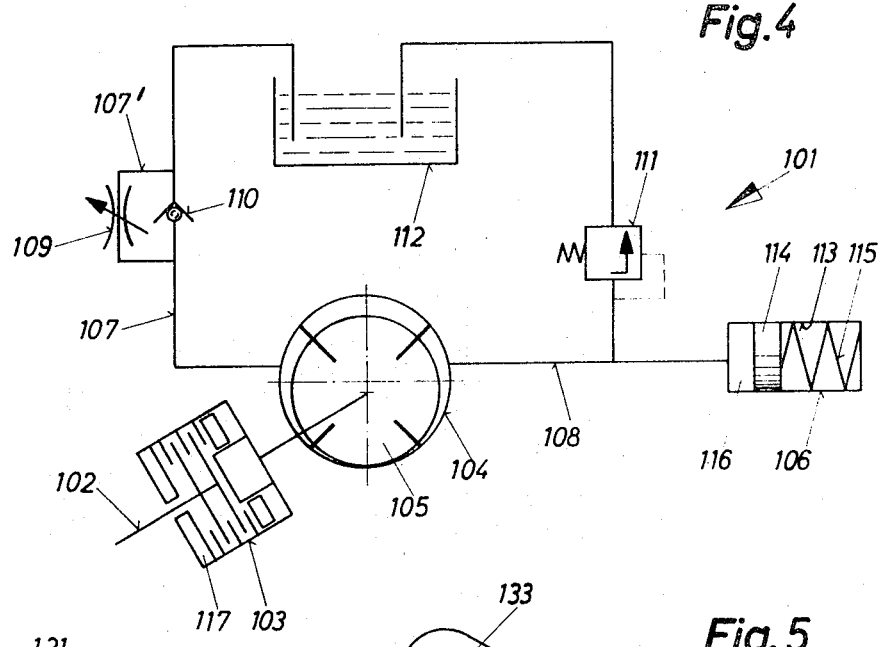
FIG. 4 shows a further modification of a hydraulic system utilizing a pressure accumulator and a friction clutch.

Referring to FIG. 4, the numeral 101 indicates the overall hydraulic system and in this instance an indexing head or device 117 is utilized which can be part of a clutch 103 for indexing the shaft 102. The clutch is connected to the rotor 105 of pump 104 and it will be understood that the general construction of the clutch utilizes friction discs for outer discs connected to the pump rotor 105 and inner discs connected to shaft 102 with an indexing device 117 as part of the assembly.

A suction line 107 connects to one side of the pump and thence through a pressure relief valve 110 bridged by conduit 107' having the adjustable throttle 109, the suction line terminating at the tank 112 for inlet feed. The other side of the pump connects to the pressure conduit 108 through a relief valve jet 111 to tank 112 and also to a pressure accumulator 106 having a piston 114 acting in pressure chamber 116 against the spring 115 within the cylinder 113, all being of conventional construction, as symbolized.

It will be understood that the clutch 103 can be applied at the will of an operator to drive pump 104, affording braking energy to shaft 102 which will be stored in the pressure accumulator 106 via pump 104 since the rotor 105 is driven by shaft 102 at the time the clutch 103 is applied as in the previous modification. Ultimately shaft 102 will come to rest since all the momentum thereof will be transformed into compression in spring 115. At this time spring 115 can then expand to push fluid to pump 104 which then acts as a motor, turning in the reverse direction and rotating shaft 102 in such reverse direction, clutch 103 remaining closed. It will be understood that a suitable free wheeling clutch or other equivalent mechanism connects the indexing device 117 with the clutch so that the indexing can be effected at a predetermined position to hold shaft 102 stationary even though the pump rotor may still be reversely rotating.

The speed of the pump rotor and thus of the shaft at the time clutch 103 is engaged is, of course, regulated via throttle 109 in this instance by regulating intake flow to the pump.

In FIGS. 3 and 4, the reverse rotation afforded by the pressure accumulator is exceedingly slow and thus very precise control is possible.

Figure 5:
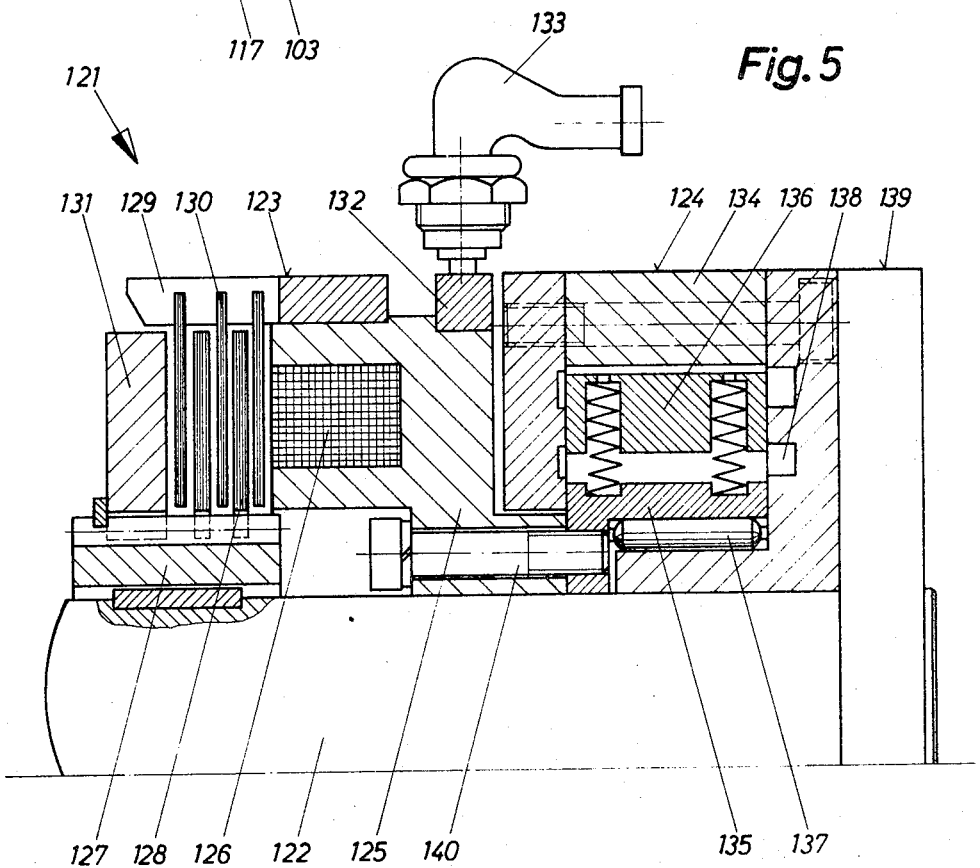
FIG. 5 shows a fragmentary section in elevation of another form of the invention utilizing an electromagnetic clutch.

Referring to FIG. 5, the system indicated by the reference numeral 121 comprises the machine shaft 122 having thereon a clutch 123 and a hydraulic pump 124 wherein the clutch is electromagnetically operated. The clutch comprises the magnet body 125 and solenoid 126 including friction discs 128 slideably keyed via collar 127 on the shaft 122. The outer friction discs 130 are slideably keyed to bars such as 129 integral with clutch 123. An armature 131 can be magnetically attracted when solenoid 126 is energized via a slip ring 132 and brush 133 to engage the clutch discs.

The rotor 135 of pump 124 is secured by means of screws 140 to the magnet body 125 and is carried within a stationary housing 134 on a needle bearing 137 on a collar of indexing device 139. Pressure fluid can flow from a source (not shown) or an accumulator (not shown) via channels such as 138 into the pump or out of the pump which has vanes 136 which are perforate and spring biased to afford pressure chambers around the peripheries thereof and being of conventional construction.

Thus the modification of FIG. 5 can be used in a hydraulic circuit as exemplified by FIGS. 2, or 3, or 4, or 6, except of course, that a magnetic instead of a pressure operated clutch is used.

When solenoid 126 is energized the clutch discs become engaged in the usual manner and shaft 122 drives the pump via the clutch, all as heretofore previously explained, causing a slowing down of shaft 122. The arrangement shown in FIG. 5 when adapted to be used in a system similar to the system of any of the other modifications operates in the same manner as the pumps therein, and as a matter of convenience the electric current to the magnet can be switched on by a pressure operated switch in the feed conduit of the supply to the pump from an external source. Indexing head 139 preferably carried in compact assembly with the pump and clutch on shaft 122, as in FIG. 1, can become effective automatically to hold shaft 122 in a predetermined angular position upon predetermined slowing or reversing of the shaft.

Referring to FIG. 6, the system arrangement 151 depicted therein comprises the machine shaft 152 on which is mounted the clutch 153, pump 154 and automatic indexing head 178. The operation of the clutch is similar to that in FIG. 1 in that a housing 155 has a pressure chamber 157 in which a piston 156 is slidable by pressure in the chamber 157 from a conduit 158. Such movement of piston 156 effects engagement of friction discs 159 and 160 through a pressure plate 162, pressing the discs against the housing cover 161. Outer discs 159 are rotatable with housing 155 while inner discs 160 are rotatable with a collar 164.

In this construction, the pump 154 comprises a hollow collar-like piston 163 which is slideable and rotative between the outer collar 164 and an inner collar 165, the piston itself being in the form of a foreshortened collar therebetween so as to leave space effecting a pressure chamber 168. The three collars are formed with cam grooves having the same pitch direction and in opposed array with balls such as 166 and 167 trapped in the grooves as shown. The inner end of the piston 163 faces into pressure chamber 168 formed between the collars 164 and 165. Pressure chamber 168 connects with a pressure accumulator 170 via a bore 169 in housing 155. The pressure accumulator comprises the pressure chamber 174, piston 172, cylinder 171 and spring 173, all in conventional construction. Chamber 174 connects via conduit 175 to the tank 176 with an intermediate relief valve 177.

In operation, pressure is fed to bore 158 to chamber 157 to close the clutch 153. This causes rotation of collar 164 by shaft 152 and a camming action via the balls, moves piston 163 to the right. Since chamber 168 is filled with hydraulic fluid such fluid is then forced into the accumulator chamber 174 up to the point where compression in spring 173 causes the shaft 152 to stop rotating. Expansion of spring 173 then forces the pressure fluid out of chamber 174 via bore 169 into chamber 168 causing piston 163 to act as a hydraulic motor piston, namely, reciprocating the collar 163 and the bore and spiral groove action will then cause slow rotation reversely of shaft 152 to a point where indexing device 178 is actuated.

Depending on whether connection from passage 169 is to the left or right of piston 163, the arrangement of FIG. 6 can be used for positioning dextro rotatory or levo rotatory shafts.

From the foregoing discussion it will be apparent that specific modifications of the invention have utility for slowing a shaft, or slowing and stopping, or slowing, stopping and reversing. These functions have utility whether or not coupled with an indexing mechanism for various purposes in the machine tool and related arts. Accordingly, the invention is not limited to indexing shafts in fixed positions but is believed capable of broader application in any machine or device having a power operated shaft normally operating at high speed. Provision for disconnect of such power is, of course, provided in any suitable way at the time the braking action of this invention is applied.

What is claimed:

1. A machine tool shaft speed control system comprising a pump, a clutch, means for engaging said clutch whereby said pump is driven by the shaft of a machine tool to effect a braking action for slowing of said shaft, and regulating means for regulating pump flow to control the slowed speed of said shaft, said pump being reversible and operable as a hydraulic motor, a machine tool shaft, means for engaging said clutch whereby said pump is driven by said shaft to affect the slowing of said shaft, said pump and clutch being coaxially mounted on said shaft, including a control device responsive to the differential pressures between inlet and outlet sides of said pump; and an automatically operable indexing device responsive to said control device to hold said shaft at a fixed angular position.

2. A machine tool shaft speed control system comprising a pump, a clutch, means for engaging said clutch whereby said pump is driven by the shaft of a machine tool to effect a braking action for slowing of said shaft, and regulating means for regulating pump flow to control the slowed speed of said shaft; said pump being reversible so as to serve as a motor and an external source of pressure connected to one side of said pump for inlet feed thereto, a pressure accumulator connected to the other side of said pump and operative to store fluid under pressure when said pump is operating to slow said shaft and to feed pressure fluid to said pump to operate said pump as a motor when said shaft stops rotating, whereby reverse rotation of said shaft is effected.

3. A machine tool shaft speed control system comprising a pump, a clutch, means for engaging said clutch whereby said pump is driven by the shaft of a machine tool to effect a braking action for slowing of said shaft, and regulating means for regulating pump flow to control the slowed speed of said shaft; including a rotary shaft, wherein said pump comprises a reciprocal hollow piston between an inner and all outer collar; said inner collar being keyed to said shaft and said outer collar being keyed to one side of said clutch, the other side of said clutch being connected to a housing, including cam grooves in said piston and said collars in opposed relation and balls in opposed cam grooves between said piston and said collars whereby engagement of said clutch effects rotation of said inner collar by said shaft to reciprocate said piston by cam action; and an accumulator for receiving pressure fluid effected by reciprocation of said piston, whereby resistance of increasing pressure in said accumulator effects retardation of the speed of said shaft to a stopping point, at which time pressure fluid is forced from said accumulator to reverse the movement of said piston for reversing the rotation of said shaft by reversed cam action.

4. A machine tool shaft speed control system comprising a pump, a clutch, means for engaging said clutch whereby said pump is driven by the shaft of a machine tool to effect a braking action for slowing of said shaft, and regulating means for regulating pump flow to control the allowed speed of said shaft, said pump being reversible so as to serve as a motor and an external source of pressure connected to one side of said pump for inlet feed thereto, a pressure accumulator connected to the other side of said pump and operative to store fluid under pressure when said pump is operating to slow said shaft and to feed pressure fluid to said pump to operate said pump as a motor when said shaft stops rotating, whereby reverse rotation of said shaft is effected, wherein said regulating means is connected to control flow to the inlet side of said pump.

* * * * *